(12) United States Patent
Hsieh

(10) Patent No.: US 7,386,118 B1
(45) Date of Patent: Jun. 10, 2008

(54) MICRO MODEM

(76) Inventor: Ming Chih Hsieh, 19256 Bellwood Dr., Saratoga, CA (US) 95070

( * ) Notice: Subject to any disclaimer, the term of this patent is extended or adjusted under 35 U.S.C. 154(b) by 382 days.

(21) Appl. No.: 11/203,877

(22) Filed: Aug. 15, 2005

(51) Int. Cl.
*H04M 1/00* (2006.01)
*H04M 9/00* (2006.01)

(52) U.S. Cl. ................................................. 379/387.01

(58) Field of Classification Search ........... 379/387.01, 379/93.05
See application file for complete search history.

(56) References Cited

U.S. PATENT DOCUMENTS 6,259,726 B1 * 7/2001 Saadeh et al. ............... 375/222

\* cited by examiner

*Primary Examiner*—Curtis A Kuntz
*Assistant Examiner*—Alexander Jamal
(74) *Attorney, Agent, or Firm*—Robert Samuel Smith

(57) ABSTRACT

A miniaturized modem system including a modem chip on a board and a DAA chip on another board mounted together so that the boards face one another thereby substantially reducing the size of the system. The arrangement satisfies the requirement of the FCC for maintaining a minimum limit on spacing between the modem section and the DAA section thereby avoiding inadvertently applying voltage surges to the phone line. The modem system is mounted directly on a housing that is a receptacle for a telephone jack thereby further substantially reducing the size of the modem system.

5 Claims, 2 Drawing Sheets

MICRO MODEM

FIELD OF THE INVENTION

This invention relates to modems and particularly to a miniaturized modem that plugs directly into a telephone line.

BACKGROUND AND INFORMATION DISCLOSURE

The early phone line was a pair of twisted wires, which was found to be useful and economical for transmitting the analog voice signal from the phone to its destination. These lines continue to be in wide use up to the present time, particularly for transmitting the voice signal from the phone to the local phone office on a "local loop".

With the development of devices that generate digital signals, it became imperative to transmit the data from these devices to other digital devices.

In addition, it is economical to transmit signals from numerous sources simultaneously on one line as the demand for more transmitting capacity has grown.

The technique that has evolved has been to convert the digital signal at each origin of the signal to an analog signal by amplitude, phase or frequency modulation of a carrier wave. Up to twelve such modulated waves may be transmitted simultaneously (stacking) in one phone line The requirement to convert a digital signal to an analog signal at the source of the signal for transmission over a phone line; and to convert an analog signal from the transmission line to a digital signal for interpretation by a digital device has been the motivation (and evolution) for developing the modem.

A modem is a circuit package connected between an end of a phone line and a source of a digital signal. The modem converts the digital signal to analog form so that the signal can be transmitted by the phone line to an intended receiver of the signal. If the receiver can process only a digital signal, then the signal must first be converted back to digital form by a second modem connected between the receiver and the other end of the phone line.

FIG. 1 (PRIOR ART) is a block diagram of a typical system showing two data terminal equipments (DTE) 10, 12 connected by a telephone line 14 through a pair of modem systems 16, 18. Each DTE, 10, 12, has a UART, shown in FIG. 2 (PRIOR ART)

The data signal is output in parallel from the DTE 10 and converted to a serial signal by the respective UART. UART. The serial signal is input to one modem 16 that converts the serial signal from a digital signal to an analog signal for transmission over the telephone line 14. The analog signal is converted back to a digital signal by the second modem and then converted to the original parallel signal by the second UART 22 for input to the second DTE 24.

The typical telephone line between the DTE and the local telephone office is a twisted pair of wires.

The transmission format of the string of bits and zeroes representing words of data is determined by the DTE and includes "marks" and "spaces". A mark is represented as one level of voltage or current; a space is represented by another level of voltage or current. Marks and spaces are included in the stream of bits and zeroes to mark the timing of the message. The pattern of marks and spaces depends on the mode of the DTE being any one of simplex, (one way), duplex (alternate one way), synchronous (simultaneous two way). The "asynchronous" mode is characterized by marks and spaces that synchronize the signal reception by the receiving DTE with the signal transmission from the sending DTE.

The history of MODEM development has included a number of versions particularly directed toward smaller size with improved convenience.

The first MODEMs were enclosed in housings that were about the size of a cigar box. As fabrication of circuits improved, MODEMs were developed in which all of the components of the MODEM were mounted on a single board and occupied smaller space.

The demand for decreased size of the MODEM is generated by several factors.

One factor is the simple taste of the public for smaller and smaller devices. "A MODEM housing the size of a matchbox is inherently more acceptable to the buying public than a size of a cigar box.

A more urgent factor is the increasing complexity of networks where telephone connections to numerous branches requires that such connections be assembled together in as small a space as possible.

These requirements led to versions of more compact MODEMs that gained wide acceptance in the marketplace.

The current trend in miniaturization by means of very large scale integration (VLSI) has led to the development of single and multiple chip sets of integrated circuits that perform most of the functions required of a modem.

The present approach to modem design is directed toward a specialized chip set provided with all of the required modem functions.

However, in spite of the developments introduced by the most recent MODEMs, there is still a need for a smaller less imposing MODEM. The need is particularly manifested in the desire for tighter clusters of line connectors.

A restraint on the reduction of size of the MODEM is imposed by isolation that is required between components of the MODEM.

UL Standards have been established for limiting the distance between the line components and the MODEM circuit.

This requirement inherently places a restriction on the reduction in size of the modem that can be achieved by applying the present approach to Modem design.

SUMMARY OF THE INVENTION

It is an object of this invention to reduce the amount of wiring required to assemble a network of connections between MODEMs and telephone lines. telephone It is an object of this invention to provide a modem in which any degradation of signal between the MODEM and the direct connection of the MODEM to the telephone line is minimized.

In this connection, it is an object that the wiring between the MODEM and telephone line be as short as possible.

It is a further object that any arrangement for achieving this object may not sacrifice the protection afforded by isolation components.

It is a further object to facilitate the task of installing connection of the MODEM to the telephone line.

It is another object to take advantage of recent developments in the electronic arts wherein significant size reduction of key components of a MODEM has been realized.

This invention is directed toward a MODEM including modem components mounted on one board and, phone line interface components (DAA) mounted on a second board. The two boards face one another according to an arrangement that substantially reduces the area that is otherwise required by the modems of the present art. Terminals on each board are connected to surge protecting components (capacitor and transformer) which also perform as sturdy supports that space the two boards from one another.

This arrangement effects a very substantial reduction in the area subtended by the board in accordance with the objective of the invention. The arrangement also provides a package whose overall size is comparable to the standard telephone jack so that the jack and MODEM are contained in one small package (about the size of a thimble) that snaps conveniently into the standard telephone jack.

This arrangement provides the spacing between the MODEM and line components that is required by the UL regulations.

The inclusion of the MODEM and line components connected directly to the line terminals of the telephone jack, eliminates extra wiring since the package is simply "plugged into" a standard phone line receptacle.

DESCRIPTION OF A BEST MODE

Figure 1:
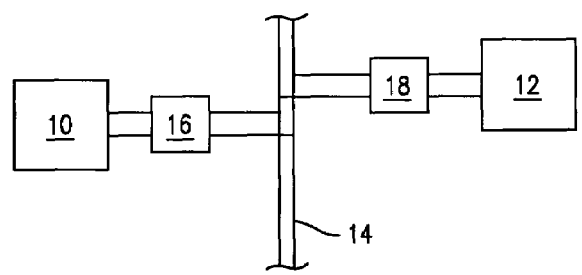
FIG. 1 is a block diagram illustrating use of two modems to conduct communication between two DTEs on a telephone line.
Figure 2:
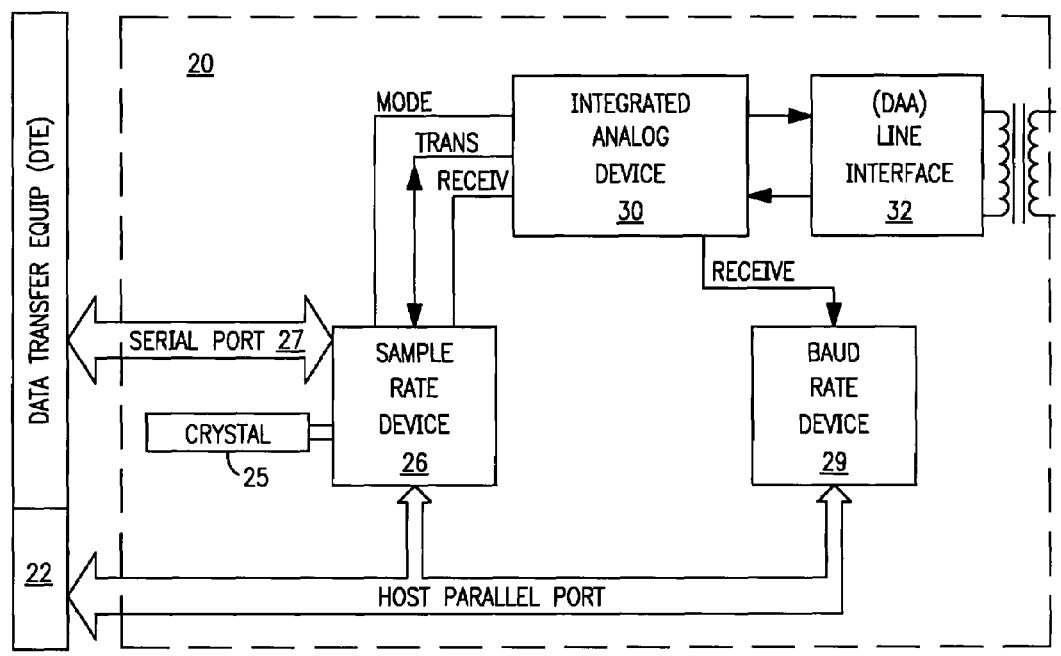
FIG. 2 is a block diagram illustrating the major components of the modem system of FIG. 1.

Turning now to a discussion of the drawings, FIG. 2 is a block diagram of a typical modem system 20 of the prior art connected to user data terminal equipment, (DTE) 22 and a "data communication equipment" (phone line) 24.

The DTE 22 is connected to a "sample rate device" 26 through a serial port 27 so that data signals in serial format can be transmitted directly between the DTE 22 and sample rate device 26.

A baud rate device 29 is connected to the "sample rate device" 26 and the DTE 22 so that a signal in parallel format can also be transmitted between the DTE and the sample rate device 26.

A "crystal oscillator" 25 applies a clock signal to generating a carrier signal in the sampling device 26.

The "sample rate device" 26 applies the DTE signal to modulating the carrier signal.

An integrated analog device 30 is connected to receive a mode select signal and the modulated signal from the sample rate device and is connected to send a timing strobe and demodulated signal received from the DTE 22 to the baud rate device 29 and the sample rate device 26.

The integrated analog device 30 performs frequency filtering and interfaces the modem to the transmission facility through the "data access arrangement" 32.

The "data access arrangement (DAA)" 32 block is a phone line protecting circuit connected between the modem and the phone line. It is required by the federal Communications Commission in each device that is electrically connected to the telephone network in order to protect the phone line from the possible event that any point on the modem side of the DAA were to inadvertently contact a high voltage source (110 or 220 volts) that would otherwise damage components (the DCE) on the phone line side of the DAA.

According to the FCC regulations, the phone line components must be spaced at greater than a minimum distance specified by FCC regulations.

Modems of the prior art have met this requirement by arranging the modem components on one board and the DAA components on another board wherein the two boards lie in the same plane.

Figure 3:
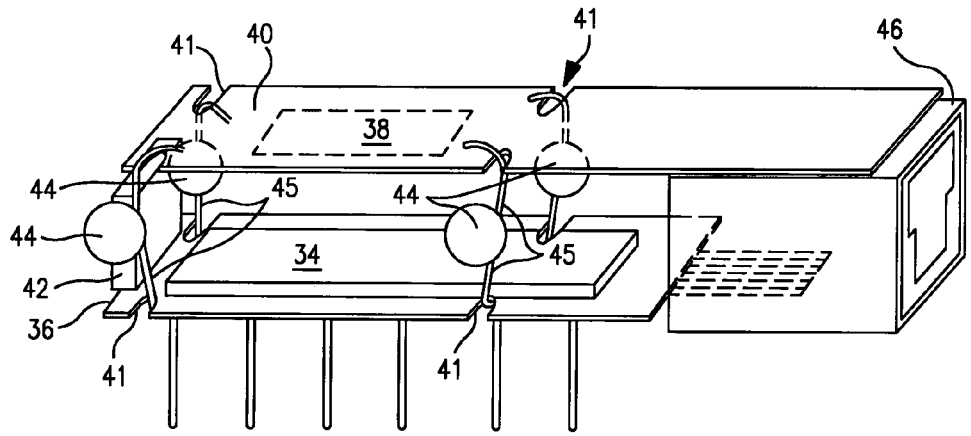
FIG. 3 is a perspective view of the modem system of this invention in which two boards are packaged with a housing poised for plugging into a standard phone receptacle.

FIG. 3 is a perspective view showing the novel arrangement of the modem system of this invention.

There is shown a modem chip 34 mounted on a modem board 36. And a DAA chip 38 mounted on a DAA board 40.

The DAA chip 38 is electrically coupled to the modem chip 34 by a transformer 42. So that components (the DAA chip 38) on the DAA board 40 are protected from voltage surges that may inadvertently occur in any of components on the modem board 36. Such surges might arise from accidental contact with 110-220 volt contacts.

Modem chips and DAA chips are manufactured by several companies including Texas Instruments, Motorola and National Semiconductor.

As shown in FIG. 3, it is feature of this invention that the DAA board 38 subtends the modem board. i.e., the DAA board 40 is supported by the transformer 42 and capacitors 44 to overlie the modem board so that all of the components of the DAA board are spaced at least the distance required by the FCC from the modem components. Yet the entire package (modem and DAA) is more compact than the modem-DAA device of the prior art.

Figure 4:
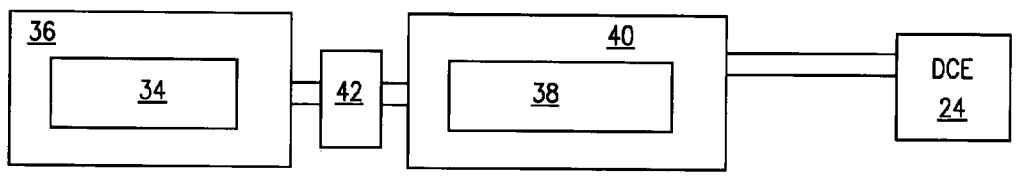
FIG. 4 shows the "spread out" arrangement of modem systems of the prior art.

As illustrated in FIG. 4 (prior art), the modem board 36 and DAA board 40 lie on the same plane so that the combination of the boards is greatly "spread out" compared to the arrangement of the present invention As shown in FIG. 3, an end of the DAA board 40 is mounted on one side of the transformer 42 and an end of the modem board 38 is mounted on the opposite side of the transformer 42.

In addition, four capacitors 44 provide further support to the two boards spaced from one another. One lead 45 from each capacitor 44 is secured to the modem board 36 and the other lead from each capacitor 44 is secured to the other DAA board.

The use of the capacitors 44 to support the modem board 36 and the DAA board 40 in their spaced relation to one another provides better electrical isolation from one another than solid metal supports.

Figure 5A:
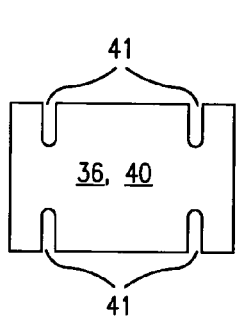
FIG. 5A shows the modem and DAA boards with mounting slots.
Figure 5B:
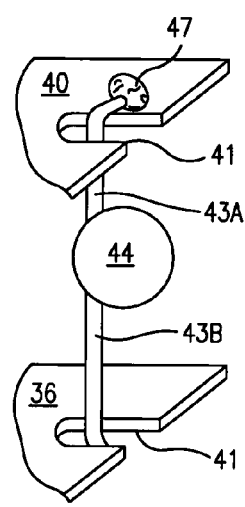
FIG. 5B shows a capacitor secured to a board of FIG. 5A.

However, closely spaced attachment of the capacitors 44 to the small boards 36, 40, requires a special board configuration which is an important feature of this invention. FIGS. 5 A,B show the detailed structure of the modem board 36 and the DAA board 40 to overcome this manufacturing problem. Each board has four slots 41 which are aligned with four slots 41 in the other board. Each capacitor 44 is mounted with one lead 43 A in the slot of the modem board 36 and the opposite lead 43B mounted in a slot of the DAA board 40. The end of the lead 43 A,B is secured to the board 36, 40 by adhesive 47.

FIG. 3 shows the assembled modem 36 and DAA 40 boards mounted on one end of a thimble sized housing (tube) 46 having a rectangular cross section. Leads from the DAA chip 38 mounted on one end of housing 46 extend into one end of the housing 46 and are terminated inside the housing 46. A male telephone jack (not shown) is insertable into the opposite end of the housing 46. and make contact with the leads from the DAA.

There has been described a self-contained miniaturized modem system which comprises a modem section and a DAA section. The modem section is "folded back" over the DAA section such that a compact package is provided yet the minimum spacing between the DAA components and the modem components is maintained as required by the FCC.

Each section is mounted on a pc board facing the other section mounted on the other board. This arrangement of the boards satisfies the FCC requirement for a specified minimum separation of the modem components from the DAA components. The arrangement of this invention provides a much more compact arrangement than modems of the prior art.

An essential feature of this invention is therefore that the largest dimension of the DAA-modem package is no larger than the largest dimension of either the DAA circuit or the modem circuit.

The modem chip is a 12 lead "dip" integrated circuit package wherein the male leads are readily accessible for insertion into a 12 lead "dip" female socket.

Variations and modifications of this invention may be contemplated after reading the specification and studying the drawings, which are within the scope of this invention.

For example, it is well known in the field of modem arts that modems have appeared on the market that has capabilities in addition to modulation-demodulation. For example, additional capabilities include compression-decompression, attenuation equalization, frequency equalization and mode selection. Such capabilities are incorporated into the integrated analog device 30 where the signal is modified by digital filtering techniques. These variations are described in "The Ultimate Modem Handbook:" chapter 12 published by Prentice Hall and incorporated by reference into this specification. This same reference lists sources of modem chips and DAA chips In one version of the invention, the DAA and modem are mounted on one end of a housing arranged to receive a telephone jack in the other end.

In the context of this specification, the term "modem" is intended to mean a circuit that performs at least the functions of modulation-demodulation on a signal transmitted between a DTE and a phone line and may perform additional functions as discussed above.

In the context of this specification, the term "modem system" is under stood to mean the entire package of a modem and a DAA.

In the context of this specification, the term DAA is intended to mean a circuit interposed between a modem and a phone line where the function of the circuit is to isolate the phone line from voltage surges that inadvertently originate in the modem.

Another modification of this invention is to replace each capacitor with an insulator stake although the version of fig. using capacitors is preferred for its greater ability to deaden the effects of surges.

In view of such variations, it is therefore wished to define the scope of the invention by the appended claims.

What is claimed is:

1. A modem system for transmitting a signal between a DTE and a phone line which comprises:
   a modem circuit;
   a DAA circuit coupled to said modem circuit;
   means for coupling said DAA circuit to said phone line;
   said DAA circuit mounted on said modem circuit and subtending said modem circuit forming a package whose largest dimension is about the same as a largest dimension of any one of said DAA circuit and a modem circuit;
   said modem circuit comprising modem components mounted on a modem board;
   said DAA circuit comprising DAA components mounted on a DAA board;
   means for securely mounting said DAA board onto said modem board and facing said modem board and subtending one side of said modem board; and spaced from said modem board by a distance no less than required by FCC regulations;
   said DAA circuit is coupled to said phone line by a transformer;
   said means for securely mounting said DAA board onto said modem board comprises an edge of said modem board secured to one end of said transformer and said DAA board secured to another end of said transformer opposite said one end of said transformer;
   said means for securely mounting said DAA board onto said modem board further comprises a plurality of capacitors, each capacitor having one lead and another lead;
   said means for securing said one lead to one location on said DAA board and for securing said another lead to another location on said modem board comprises:
      an open slot extending from an edge of said DAA board to said one location on said DAA board; and
      an open slot extending from an edge of said modem board to said another location on said modem board; and
   said one lead adhesively secured at said one location in said open slot of said DAA board and said another lead adhesively secured in said open slot at said another location of said modem board.

2. The modem system of claim 1 wherein said means for coupling said DAA circuit to said phone line comprises:
   a housing with one opening on one end of said housing opposite another opening opposite another end of said housing;
   said DAA board has a board extension attached to said housing with terminals of said DAA circuit adjacent said one opening of said housing;
   said another opening of said housing configured for receiving a telephone jack insertable into said another opening;
   a plurality of terminals inside said housing connected to said DAA circuit and connectable to said telephone jack when said telephone jack is inserted into said another opening of said housing.

3. The modem system of claim 1:
   wherein separation between said modem components and said DAA components are spaced from said modem board by a distance no less than required by FCC regulations.

4. A modem system for transmitting a signal between a DTE and a phone line which comprises:
   a modem circuit and comprising modem components mounted on a modem board;
   a DAA circuit coupled to said modem circuit and said DAA circuit comprising DAA components mounted on a DAA board; and
   said DAA circuit mounted on said modem circuit and subtending said modem circuit forming a package whose largest dimension is about the same as a largest dimension of any one of said DAA circuit and a modem circuit;

means for coupling said DAA circuit to said phone line by a transformer;

means for securely mounting said DAA board onto said modem board and facing said modem board and subtending one side of said modem board; and spaced from said modem board by a distance no less than required by FCC regulations;

said means for securely mounting said DAA board onto said modem board comprises an edge of said modem board secured to one end of said transformer and said DAA board secured to another end of said transformer opposite said one end of said transformer;

board further comprises a plurality of capacitors, each capacitor having one lead and another lead;

means for securing said one lead to one location on said DAA board and for securing said another lead to another location on said modem board comprises:

an open slot extending from an edge of said DAA board to said one location on said DAA board; and an open slot extending from an edge of said modem board to said another location on said modem board; and said one lead adhesively secured at said one location in said open slot of said DAA board and said another lead adhesively secured in said open slot at said another location of said modem board.

5. A modem system for transmitting a signal between a DTE and a phone line which comprises:

a modem circuit comprising modem components mounted on a modem board;

a DAA circuit coupled to said modem circuit and said DAA circuit comprising DAA components mounted on a DAA board;

and said DAA circuit mounted on said modem circuit and subtending said modem circuit forming a package whose largest dimension is about the same as a largest dimension of any one of said DAA circuit and a modem circuit;

means for coupling said DAA circuit to said phone line by a transformer;

means for securely mounting said DAA board onto said modem board and facing said modem board and subtending one side of said modem board and spaced from said modem board by a distance no less than required by FCC regulations;

said means for securely mounting said DAA board onto said modem board comprises an edge of said modem board secured to one end of said transformer and said DAA board secured to another end of said transformer opposite said one end of said transformer; and said means for securely mounting said DAA board onto said modem board comprises a plurality of capacitors, each capacitor having one lead and another lead;

a housing with one opening on one end of said housing opposite another opening on an opposite end of said housing;

said DAA board has a board extension attached to said housing with terminals of said DAA circuit adjacent said one opening of said housing;

said another opening of said housing configured for receiving a telephone jack insertable into said another opening;

a plurality of terminals inside said housing connected to said DAA circuit and connectable to said telephone jack when said telephone jack is inserted into said another opening of said housing.

\* \* \* \* \*